May 2, 1961 C. GERST 2,982,141
STEERING AXLE AND TRANSMISSION
Filed Nov. 13, 1959 6 Sheets-Sheet 5

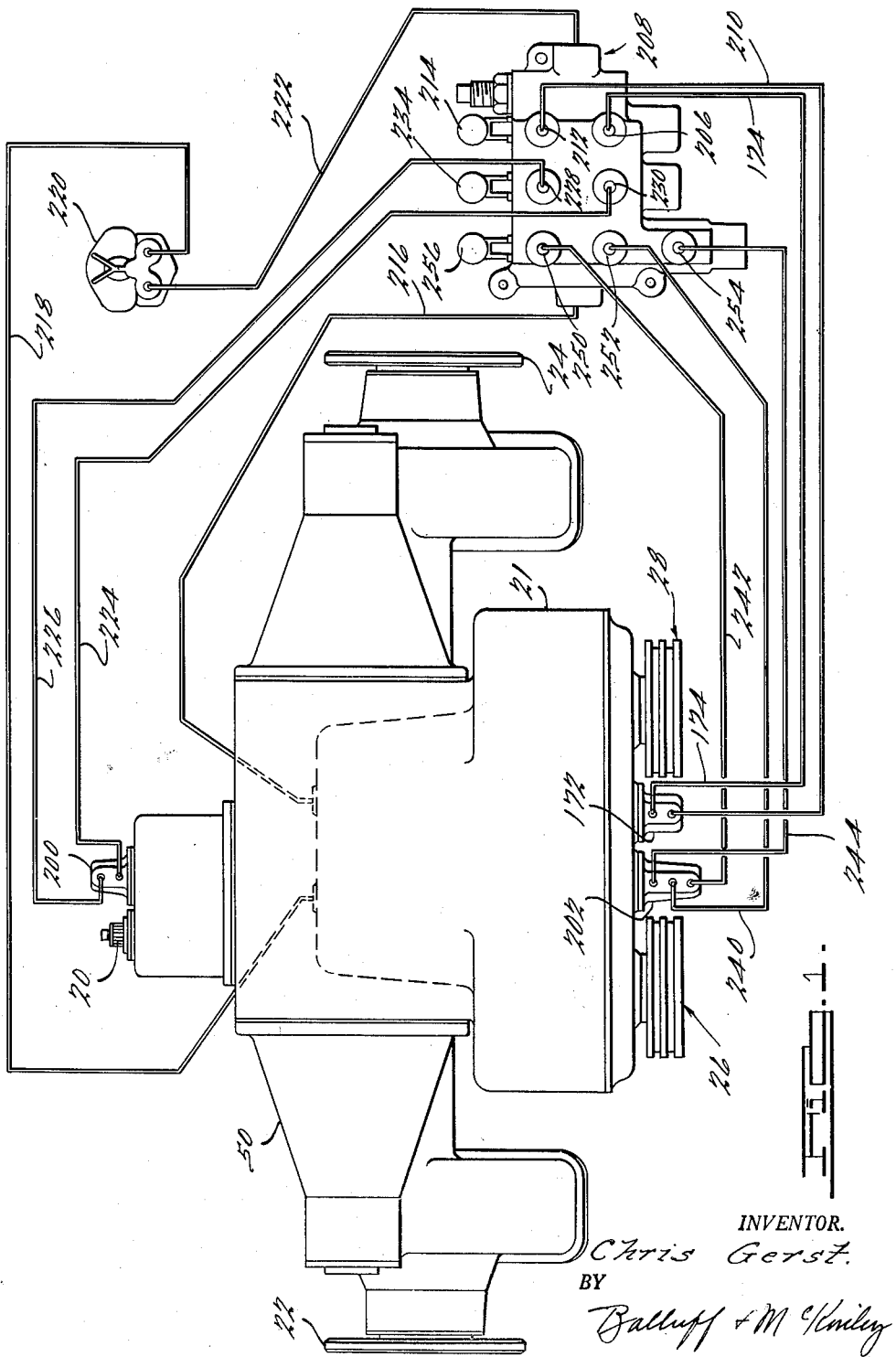

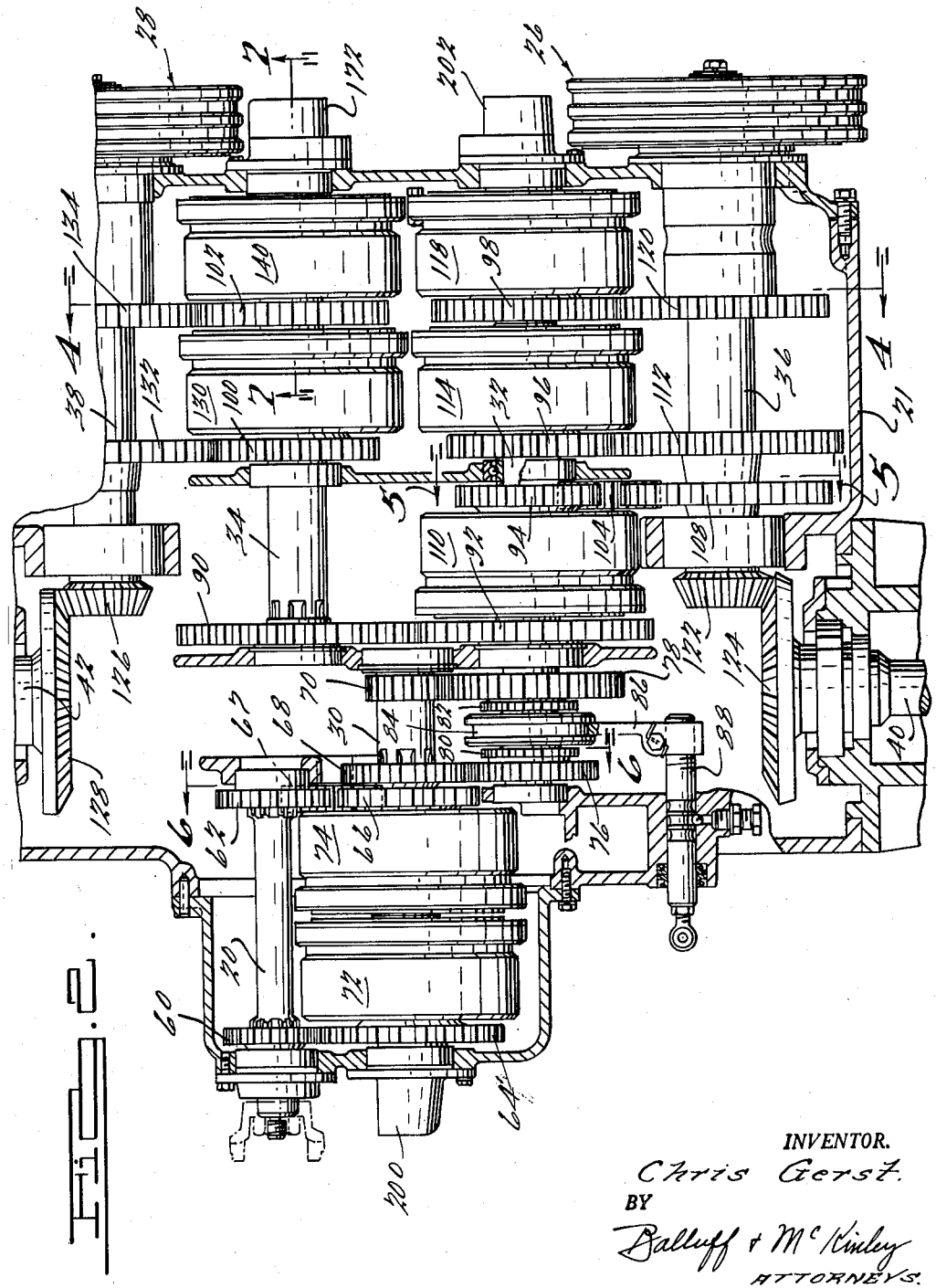

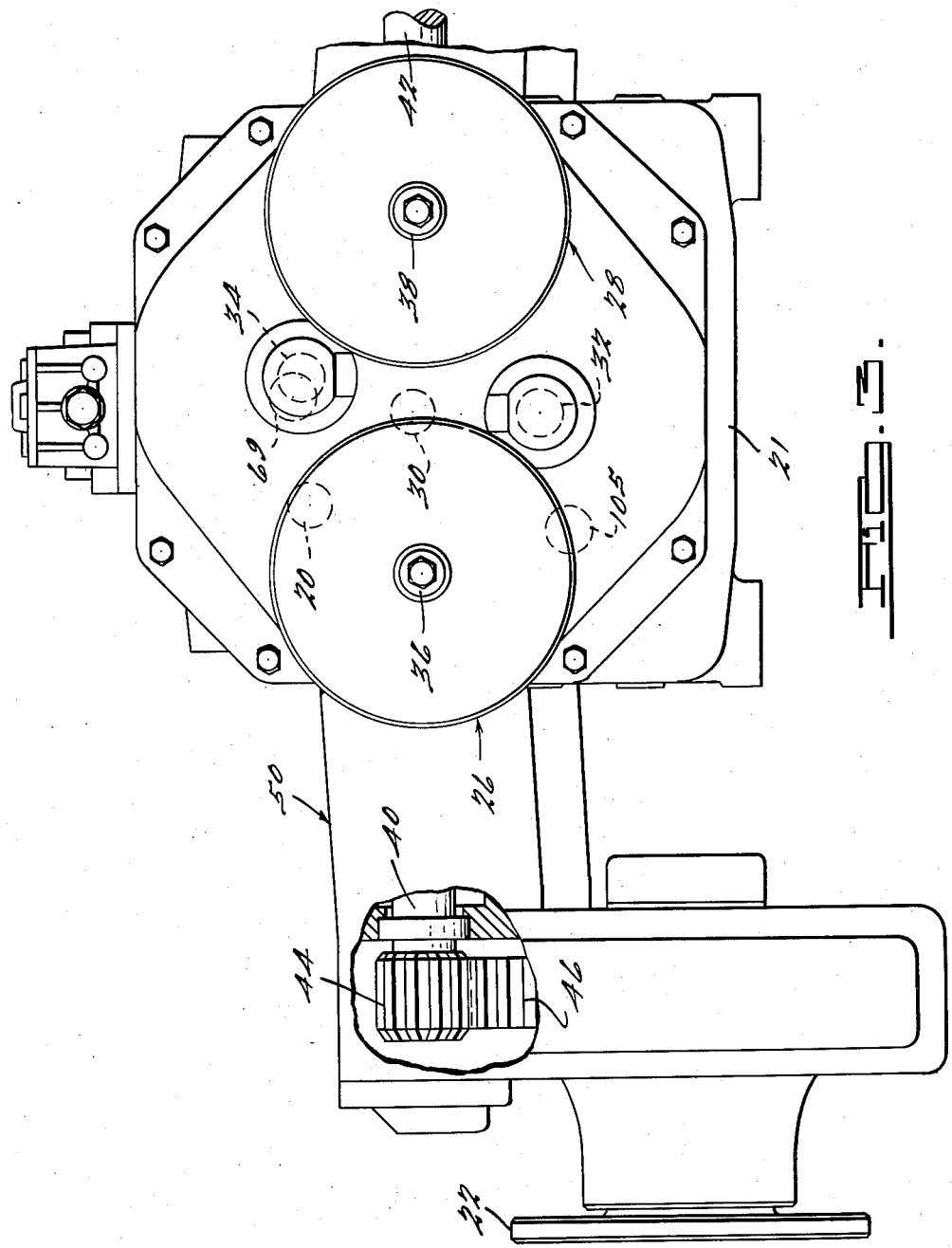

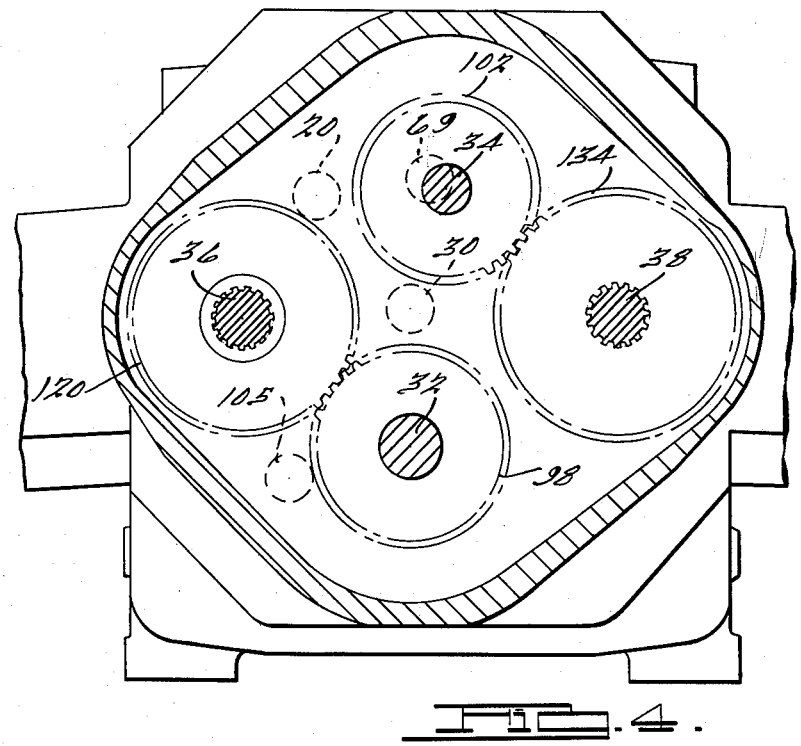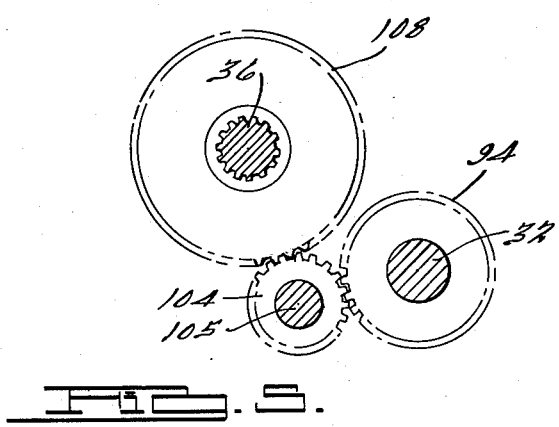

INVENTOR.
Chris Gerst.
BY
Balluff & McKinley
ATTORNEYS.

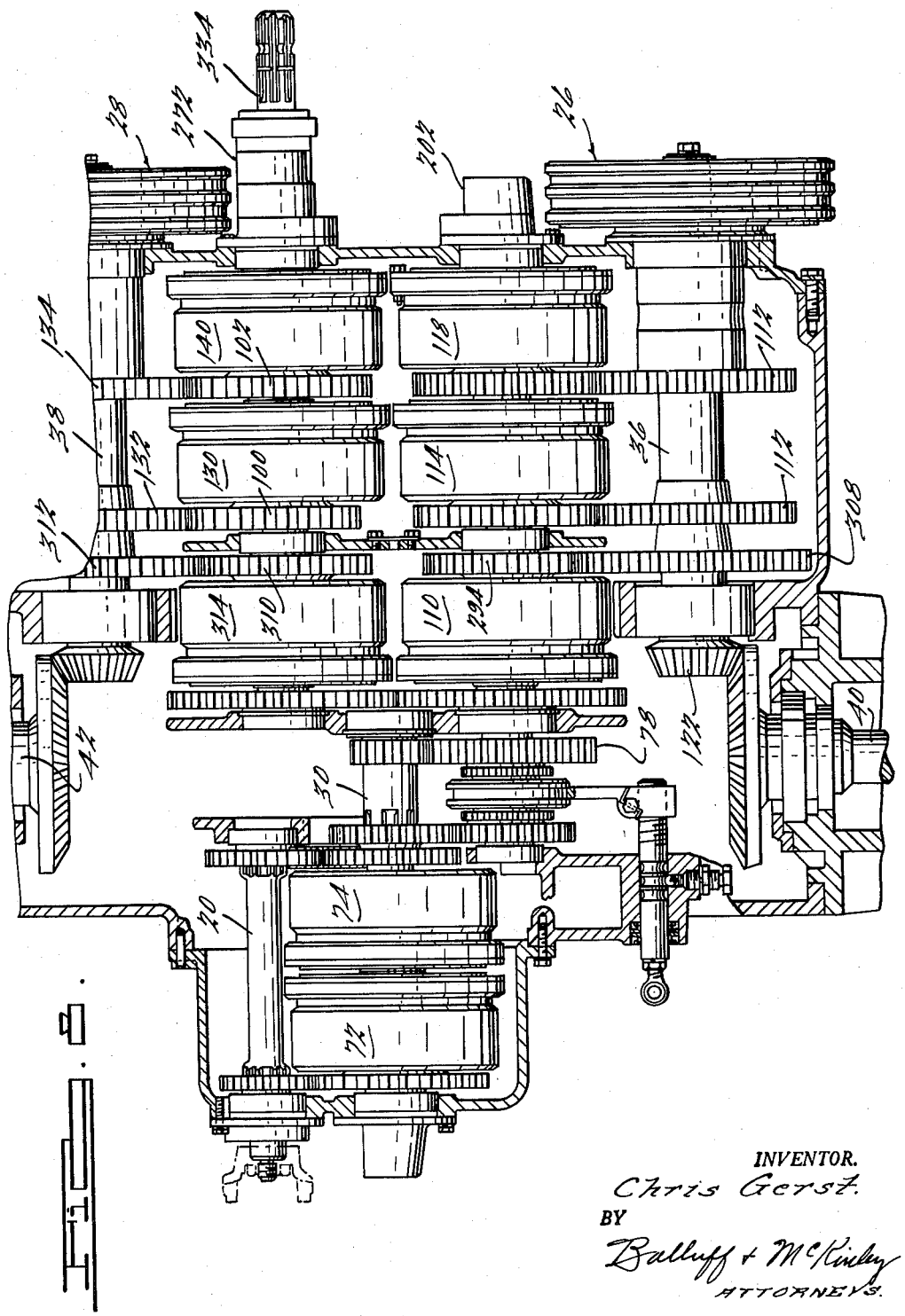

United States Patent Office 2,982,141
Patented May 2, 1961

2,982,141
STEERING AXLE AND TRANSMISSION
Chris Gerst, 19303 W. Davison Ave., Detroit 23, Mich.
Filed Nov. 13, 1959, Ser. No. 852,661
23 Claims. (Cl. 74—360)

This invention relates to transmissions and has particular reference to steering axle and transmission assemblies adapted for use in tractor type vehicles. The basic design of the transmission disclosed readily lends itself to variations, thus making it possible to produce a series of transmissions with different characteristics and features so as to meet a wide variety of requirements without having to duplicate the tooling for each model. For example, the transmission disclosed in Figures 1 to 7 is a four-speed forward and four-speed reverse counter-rotating transmission, whereas the transmission disclosed in Figure 8 is a six-speed forward and six-speed reverse steering type transmission.

A principal object of the invention therefore is to provide a basic design for a transmission and axle of this type which readily lends itself to variations, thus making it possible to produce a series of models with different characteristics and features so as to meet a wide variety of requirements without having to duplicate the tooling for each model.

Another object of the invention is to provide a novel, simple and relatively inexpensive steering axle and transmission which is adapted for use on crawler or wheel type tractors.

Other and further objects of the invention will be apparent from the following description and claims and may be understood by reference to the accompanying drawings, of which there are six sheets, which by way of illustration show preferred embodiments of the invention and what I now consider to be the best mode of applying the principles thereof. Other embodiments of the invention may be used without departing from the scope of the present invention as set forth in the appended claims.

In the drawings:

Figure 1 is a plan view of a steering axle and transmission embodying the invention, together with a schematic illustration of a hydraulic control system therefor;

Figure 2 is a fragmentary developed view of a counter-rotating steering axle and transmission embodying the invention;

Figure 3 is a fragmentary rear elevational view of the steering axle and transmission;

Figure 4 is a fragmentary sectional view taken along the line 4—4 of Figure 2;

Figure 5 is a fragmentary sectional view taken along the line 5—5 of Figure 2;

Figure 8 is a view similar to Figure 2 showing a modified form of the invention.

Figure 6:
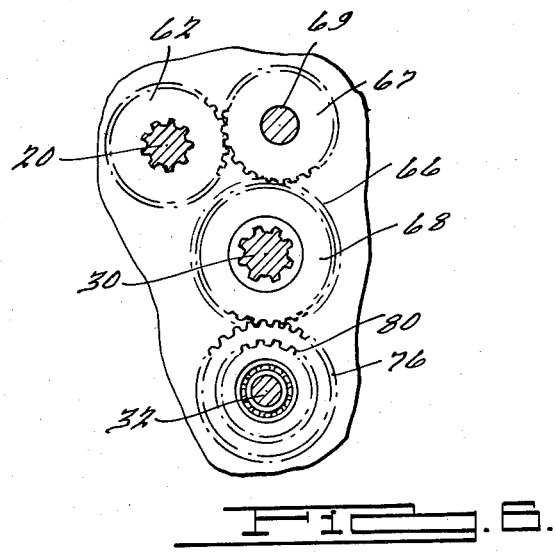
Figure 6 is a fragmentary sectional view generally taken along the staggered line 6—6 of Figure 2.

As shown in Figure 1, the transmission includes an input shaft 20 adapted to be suitably coupled to the engine of the vehicle and drive sprockets 22 and 24 adapted for driving the endless tracks of the vehicle. The sprockets may be replaced by road wheels. Figure 1 also schematically illustrates a hydraulic control system for the transmission whereby the power train from the input shaft 20 to the sprockets 22 and 24 may be controlled so that sprockets 22 and 24 may be simultaneously driven forwardly or reversely at the same or different speeds or so that one sprocket may be driven while the other is braked, and to this end brakes indicated generally at 26 and 28 are provided for selectively braking each sprocket of the transmission. The transmission is also adapted to drive one of the sprockets forwardly while the other is being driven reversely.

The transmission comprises a lubricant containing housing or casing 21 for supporting the bearings for the various shafts of the transmission and for enclosing the shafts, gears and clutches thereof.

In general, and as illustrated in Figure 2, the transmission includes input shaft 20, countershaft or clutch shaft 30, parallel clutch shafts 32 and 34, output or brake shafts 36 and 38 and laterally extending aligned shafts 40 and 42. The shaft 40 comprises part of a final drive assembly (Figures 2 and 3) for one side of the transmission which includes pinion 44 fixed to the shaft 40 for rotation therewith, gear 46 in mesh with the pinion 44 and the sprocket 22, which is suitably coupled to the shaft (not shown) on which the gear 46 is mounted. The shaft 40 and gears 44 and 46 and the shaft on which the gear is mounted are suitably enclosed and mounted in a housing extension 50 which is fixedly mounted on and projects laterally from one side of the main housing 21 of the transmission. A similar final drive is provided for the other side of the transmission whereby the sprocket 24 is journaled for rotation about an axis in line with the axis for the sprocket 22.

The specific designation applied to the shafts is for identification purposes.

Figure 7:
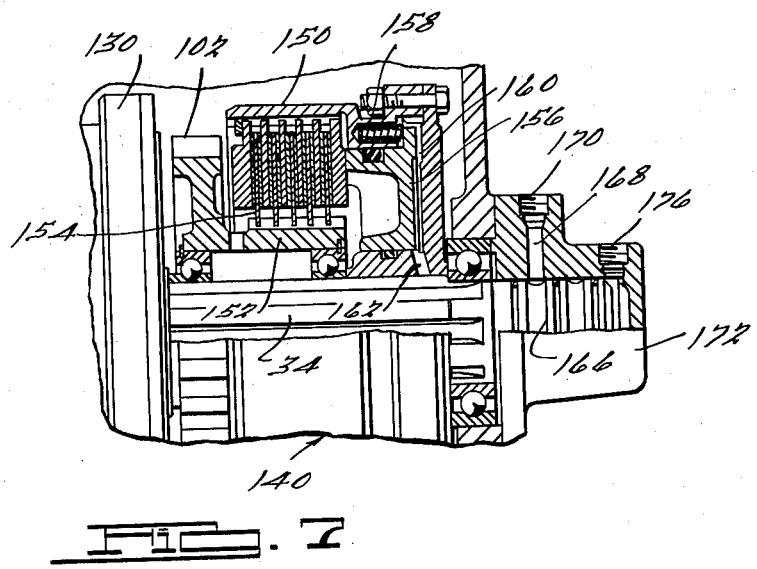
Figure 7 is a fragmentary sectional view of one of the hydraulically actuated multiple disc clutches and taken along the line 7—7 of Figure 2.

The shaft 20 has gears 60 and 62 (Figure 2) fixed thereon for rotation therewith. The counter shaft 30 has gears 64 and 66 journaled thereon and gears 68 and 70 fixed thereon. The teeth of the gear 64 are in constant mesh with the teeth of the gear 60. The teeth of the gear 66 and of the gear 62 are in constant mesh with the teeth of an idler gear 67 on shaft 69 (Figure 6) whereby the gear 66 will be driven from the shaft 20 in a direction opposite to that in which the gear 64 is driven. The hub of the gear 64 forms the driving part of a hydraulically actuated normally disengaged multiple disc clutch 72 which is operatively disposed between the gear 64 and the shaft 30 and which when engaged is adapted to couple the shaft 30 to the gear 64 for rotation therewith. The drum or driven part of clutch 72 is fixed to shaft 30. The construction of the clutch 72 is essentially as disclosed in my prior United States Letters Patent 2,880,834 for "Hydraulically Actuated Multiple Disc Clutch." A typical cross section of such a multiple disc clutch as employed in this transmission is illustrated in Figure 7.

The hub of the gear 66 forms the driving part of a hydraulically actuated normally disengaged multiple disc clutch 74, like the clutch 72, which is operatively disposed between the gear 66 and the shaft 30 and which is adapted when engaged to couple the shaft 30 to the gear 66 for rotation therewith. Thus, depending upon which of the clutches 72 and 74 is engaged, the countershaft 30 may be driven in the same or in the opposite direction from and with respect to the shaft 20. Thus the shafts 20 and 30 and the gears and clutches therebetween provide reversible gearing on the input side of the transmission.

The gear 68, which is fixed to the shaft 30 for rotation therewith, is in constant mesh with a gear 76, which is journaled on the clutch shaft 32. The gear 70, which is fixed to the shaft 30 for rotation therewith, is in constant mesh with gear 78, which is journaled on the clutch shaft 32. Integral with the hub of the gear 76 is an annular set of clutch teeth 80 and integral with the hub of the gear 78 is an annular set of clutch teeth 82. An axially shiftable annular clutch member 84 slidably splined to the clutch shaft 32 is illustrated in Figure 2 in a neutral position between the sets of clutch teeth 80 and 82. The clutch member 84 is provided with a set of clutch teeth cooperable with the set 80 so that, when the clutch member 84 is shifted to left from the position as shown in Figure 2, the gear 76 will be coupled to the clutch shaft 32 for rotation therewith, whereby the clutch shaft 32 may be driven from the shaft 30 through the gears 68 and 76. The clutch member 84 is also provided with another set of clutch teeth cooperable with the clutch teeth 82 so that, when the clutch member 84 is shifted to the right from the position illustrated in Figure 2, the gear 78 will be coupled to the clutch shaft 32, whereby the latter will be driven from the clutch shaft 30 through the gears 70 and 78. A fork 86 running in a groove in the clutch member 84 is carried by a shift rod 88 whereby the clutch member 84 may be shifted in one direction or the other from the neutral position illustrated so as to selectively couple the gears 76 and 78 to the clutch shaft 32 for driving the latter. Thus the gears 68, 70, 76, 78 and the clutches associated therewith provides a two-speed gearing between the counter-shaft 30 and the clutch shaft 32, whereby the latter may be driven at two different speeds either forwardly or reversely from and with respect to the input shaft 20.

The clutch shafts 32 and 34 are disposed in parallel and are geared together for simultaneous rotation in opposite directions by constant mesh gears 90 and 92, the latter of which is fixed to the shaft 32 for rotation therewith while the gear 90 is fixed to the shaft 34 for rotation therewith. The gears 90 and 92 are of the same pitch diameter whereby the shafts 32 and 34 will rotate at the same speed simultaneously but in opposite directions.

The clutch shaft 32 has gears 94, 96 and 98 journaled thereon, while the clutch shaft 34 has gears 100 and 102 journaled thereon. Gear 94 on clutch shaft 32 is in constant mesh with idler gear 104 on idler gear shaft 105 (Figure 5), and idler gear 104 in turn is in constant mesh with gear 108 fixed to the shaft 36. The hub of the gear 94 which is journaled on the shaft 32 forms the driven part of a normally disengaged clutch 110, like the clutch 72, the driving part or drum of the clutch 110 being fixed to the shaft 32 for rotation therewith. Thus the clutch 110 is operatively disposed between the gear 94 and the shaft 32 and is adapted when engaged to couple the gear 94 to the shaft 32 for rotation therewith whereby the gear 108 and the shaft 36 will be driven from the shaft 32 through the idler 104 but in an opposite direction of rotation to that of the shaft 32. The gear 96 journaled on the shaft 32 is in constant mesh with a gear 112 fixed to the shaft 36 for rotation therewith. A part integral with the hub of the gear 96 forms the driven part of a normally disengaged multiple disc clutch 114, the drum or driving part of which is fixed to the shaft 32 for rotation therewith. The clutch 114 when engaged will couple the gear 96 to the shaft 32 for rotation therewith whereby the gear 112 and the shaft 36 will be driven from the shaft 32 through the gear 96.

A part integral with the hub of gear 98 forms the driven part of a multiple disc clutch 118, the drum or driving part of which is fixed to the shaft 32 for rotation therewith. The clutch 118 and the clutch 114 are like the clutch 72. When engaged, the clutch 118 will couple the gear 98 to the shaft 32 for rotation therewith. The gear 98 is in constant mesh with the teeth of the gear 120 which is fixed to the shaft 36 for rotation therewith. The clutches 110, 114 and 118 are normally disengaged and are selectively engageable as will be pointed out hereafter. Thus the gears 94, 104 and 108 and the clutch 110 provide a clutch controlled driving connection between the shafts 32 and 36. Similarly, the gears 96 and 112 and the clutch 114 provides a second clutch controlled driving connection between the shafts 32 and 36 and in a similar manner the gears 98 and 120 and the clutch 118 provide a third driving connection between the shaft 32 and the shaft 36. Such driving connections are parallel driving connections and are independent of each other. The driving connections controlled by the clutches 114 and 118 will drive the shaft 36 in a direction of rotation opposite to that of the shaft 32, whereas the driving connection controlled by the clutch 110 will drive the shaft 36 in the same direction as the shaft 32.

While the shafts 32 and 34 are geared together for simultaneous rotation at the same speed in opposite directions, the driving connections between the shafts 32 and 36 are independent of the driving connections between the shafts 34 and 38. Thus, by selectively engaging the clutches 110, 114 and 118, the direction in which the shaft 36 is driven may be reversed so that the drive sprocket 22 which is driven from the shaft 36 may be driven forwardly or reversely independently of the drive sprocket 24. The shaft 36 has the brake 26 associated therewith, the brake 26 being normally disengaged. Brake 26 may be any conventional brake of the type commonly in use for braking purposes on tractors incorporating counterrotating or steering axle transmissions. The shaft 36 has fixed thereto a bevel pinion gear 122, the teeth of which are in constant mesh with bevel gear 124 fixed to the shaft 40. Similarly, the shaft 38 has brake 28 associated therewith. In addition, shaft 38 is provided with bevel pinion 126 which is in constant mesh with bevel gear 128 which is fixed to shaft 42 of the final drive assembly for the right-hand side of the transmission and which includes the drive sprocket 24 which is driven from the shaft 42 in a manner similar to that in which the sprocket 22 is driven from the shaft 40.

A clutch 130 like the clutch 110 is operatively disposed between the gear 100 and the shaft 34 whereby, when the clutch 130 is engaged, the gear 100 will be coupled to the shaft 34 for rotation therewith. Gear 100 is in constant mesh with gear 132 fixed on shaft 38. Gear 102 is in constant mesh with gear 134 also fixed on shaft 38. A clutch 140 like the clutch 130 is operatively disposed between the gear 102 and the shaft 34 and is adapted when engaged to couple the gear 102 to the shaft 34 for rotation therewith. Thus the gears 100 and 132 and the clutch 130 provide a driving connection between the shafts 34 and 38, while the gears 102 and 134 and clutch 140 provide a second driving connection between the shafts 34 and 38. The gears 100 and 132 are of different pitch diameters than the gears 102 and 134, respectively, so that the two driving connections provide different speed reductions between the shafts 34 and 38. The gears 96 and 112 are of the same size as the gears 100 and 132, respectively, so that, when the clutches 130 and 114 are engaged, the sprockets 22 and 24 will be driven in the same direction and at the same speed. Similarly the gears 98 and 120 are of the same size as the gears 102 and 134, respectively, so that, when the clutches 118 and 140 are engaged, the sprockets 22 and 24 will be driven at the same speed and in the same direction. However, if the clutch 110 is engaged when either of the clutches 130 or 140 is engaged, the sprocket 22 will be driven in a direction opposite to that in which the sprocket 24 is driven. The gear reduction provided by the gears 94, 104 and 108 may be the same as that provided by the gears 100 and 132 or by the gears 102 and 134 or any other suitable reduction. In this manner the sprocket 22 may be driven in one direction at the same speed or at a different speed than the speed in which the sprocket 24 is driven in the opposite direction. In addition, by selectively controlling the clutches 72 and 74, the direction of rotation of the sprockets 22 and 24 may be reversed. This arrangement permits an unusual degree of flexibility and maneuverability in a tractor incorporating a transmission embodying the illustrated construction.

As illustrated in Figure 7, the clutch 140 includes a drum 150, the hub of which is splined to the shaft 34 for rotation therewith and a hub 152 which is integral with the gear 102 and journaled on the shaft 34. The drum 150 and hub 152 carry interleaved clutch discs 154 which when clamped together by the piston 156 lock up or engage the clutch so that driving and driven parts thereof will rotate together and thus couple the gear 102 to the shaft 34 for rotation therewith. An annular piston 156 is reciprocable in an annular hydraulic cylinder 160 formed in the drum 150 and is biased to clutch disengaged position by a series of clutch springs 158 which react on a part of the drum 150 and on a peripheral flange on the piston 156 for moving the latter in a direction to release the pressure on the clutch discs 154. Fluid under pressure is supplied to the cylinder 160 through a duct 162 which communicates with a passage (not shown) in the shaft 34 which at its outer end communicates with an annular groove 166 in the shaft 34. The groove 166 communicates with a duct 168 leading to a port 170 in the cap 172. A hydraulic fluid pressure line 174 is coupled to the port 170 whereby hydraulic fluid under pressure may be supplied to the cylinder 160 of the clutch 140 for actuating the same so as to engage the clutch and thereby couple the gear 102 to the shaft 34. The construction of the clutch is such, particularly because of the clutch release springs 158, that as soon as the hydraulic pressure supplied to the port 170 is released the springs 158 will move the piston 156 to its disengaged position so as to release the clamping pressure on the clutch discs 154. The shaft 34 is provided with a second passage (not shown) which communicates at one end with the hydraulic cylinder for the clutch 130 and its other end with the port 176 in the cap 172 whereby hydraulic fluid under pressure may be supplied to the clutch 130 for engaging the same so as to couple the gear 100 to the shaft 34 for rotation therewith. The cap 172 is mounted on the transmission housing and encloses the projecting end of the shaft 34 and provides a means whereby hydraulic fluid may be supplied to the clutches 130 and 140 for selectively engaging the same.

The projecting end of the shaft 30 on which the clutches 72 and 74 are mounted is provided with a cap 200 like the cap 172, whereby hydraulic fluid under pressure may be supplied to the passages in the shaft 30 and the hydraulic cylinders of the clutches 72 and 74 for engaging the same. Similarly the projecting end of the shaft 32 is provided with a cap 202 whereby hydraulic fluid under pressure may be supplied through the three passages in the shaft 32 to the hydraulic cylinders of the clutches 110, 114 and 118 whereby such clutches may be selectively engaged.

The hydraulic fluid supply line 174 for the clutch 140 is connected to a valve port 206 in a control valve indicated generally at 208, while the hydraulic fluid pressure line 210 through which hydraulic fluid under pressure is supplied to the port 176 for the hydraulic cylinder of the clutch 130 is connected to a port 212 in the control 208. A shiftable valve member (not shown) of the control 208 and positioned by the handle 214 is constructed and arranged so that in one position thereof hydraulic fluid under pressure will be supplied to the port 212 and in another position thereof hydraulic fluid under pressure will be supplied to the port 206. Such valve member is normally positioned in a neutral position intermediate such ports 206 and 212 so as to release the pressure in the lines 174 and 210 and to port such pressure to the pressure relief line 216 which extends from the control 208 back to the transmission housing. An oil supply line 218 connected at one end to the transmission housing supplies oil therefrom to the pump 220, which in turn supplies oil under pressure through the line 222 to the control 208. The handle 214 may be moved in one direction from neutral so as to port fluid under pressure to the port 212 and in the opposite direction from neutral so as to port fluid under pressure to the port 206 whereby the clutches 130 and 140 may be selectively engaged and disengaged. The arrangement is such that only one of the clutches 130 and 140 may be engaged at one time.

In a similar manner fluid pressure lines 224 and 226 connected to the ports in the cap 200 are connected to ports 228 and 230 in the control 208. The supply of fluid under pressure to the ports 228 and 230 is controlled by a valve member (not shown) operated by a handle 234 in a fashion similar to that in which the supply of fluid under pressure is controlled to the ports 206 and 212 by the handle 214. Similarly, when the handle 234 positions the valve member in a neutral position, the fluid pressure in the lines 224 and 226 is released so that the clutches 72 and 74 will disengage. The arrangement is such that only one of the clutches 72 and 74 may be engaged at one time. However, by manipulation of the handle 234, the alternate engagement and disengagement of the clutches 72 and 74 may be readily effected.

Fluid pressure lines 240, 242 and 244 are connected to the cap 202 for supplying fluid under pressure through the passages in the shaft 32 to the hydraulic cylinders for the clutches 110, 114 and 118. Such lines are connected to ports 250, 252 and 254 in the control 208. The supply of fluid under pressure to the ports 250, 252 and 254 is controlled by a shiftable valve member (not shown) adapted to be moved by handle 256. Thus by manipulation of the handle 256 fluid under pressure may be selectively supplied to the ports 250, 252 and 254 and through the lines 240, 242 and 244 to the hydraulic cylinders of the clutches 110, 114 and 118 for selectively controlling the engagement and disengagement thereof. The valve member controlled by the valve actuating handle 256 is normally positioned in a neutral position between the ports 250 and 252 but is shiftable in one direction to supply fluid under pressure to the port 250 or in the other direction to supply fluid under pressure to the port 252 or 254, depending upon the extent of movement in the latter direction. Thus the clutches 110, 114 and 118 may be selectively engaged independently of the clutches 130 and 140 and vice versa. In the neutral position of the valve member controlled by handle 256 the fluid pressure in the lines 240, 242 and 244 is released and ported to the pressure relief line 216 as in the case of the other valves.

The transmission disclosed in Figure 8 is a six-speed forward and six-speed reverse steering axle and transmission and is basically of the same design as the transmission heretofore referred to. Actually there are only a couple of differences in the construction of such transmissions. One of such differences is that the idler 104 of the transmission of Figure 2 is omitted and in lieu thereof the gear 294 on the clutch shaft 32 is in constant mesh with a gear 308 on the output shaft 36 so that the driving connection provided thereby between the shaft 32 and 36 in the transmission of Figure 8 will drive the shaft 36 in a direction opposite to that of the shaft 32. In addition, an additional gear 310 is journaled on the clutch shaft 334 which corresponds with the shaft 34 and such gear 310 is in constant mesh with a third gear 312 on the output shaft 38. The clutch shaft 334 has gears 100 and 102 thereon as in the case of the transmission of Figure 2 so that there are three clutch controlled gear trains between the clutch shaft 334 and the output shaft 38, as well as three clutch controlled gear trains between the clutch shaft 32 and the output shaft 36. A normally disengaged multiple disc clutch 314 like the clutches 130 and 140 is disposed between the shaft 334 and the gear 310 so as when engaged to couple the gear 310 to the shaft 334 for rotation therewith. The shaft 334 is like the shaft 34, except that it is extended as shown in Figure 8 through the cap 272 so as to provide an auxiliary power take-off shaft. The cap 272 is like the cap 172, except that it has provisions for connection with three pressure fluid lines for controlling the supply of hydraulic fluid under pressure to the clutches 314, 130 and 140.

Thus by omitting the idler gear 104, substituting the gears 294 and 308 for the gears 94 and 108 and by adding the gears 310 and 312 and the clutch 314 the transmission of Figure 2 may be converted from a four-speed forward and four-speed reverse counterrotating and steering transmission to a six-speed forward and six-speed reverse steering type of transmission. The controls for the transmission illustrated in Figure 8 would be similar to the controls illustrated in Figure 1.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A steering axle and transmission comprising an input shaft, a pair of output shafts, a pair of parallel clutch shafts geared together, one of said clutch shafts extending beyond the other and being disposed in parallel relation with said input shaft, reversible gearing between said input and said one of said clutch shafts for driving said clutch shafts from said input shaft, a set of gears rotatably journaled on one of said clutch shafts, geared with one of said output shafts, another set of gears rotatably journaled on the other of said clutch shafts, geared with the other of said output shafts, and a normally disengaged clutch operatively disposed between each of said clutch shafts and each of said gears thereon for selectively coupling said gears on each of the clutch shafts thereto, the geared interconnection between said clutch shafts being independent of the geared interconnections between said clutch and output shafts, the geared interconnections between each clutch shaft and its associated output shaft providing a plurality of clutch controlled parallel driving connections between each clutch shaft and its associated output shaft, said output shafts being disposed so that a line extending between the centers of said clutch shafts passes between said output shafts, and a line extending between the centers of said output shafts passes between said clutch shafts.

2. A transmission according to claim 1 wherein the said driving connections between one of said clutch shafts and its associated output shaft includes one driving connection for driving said output shaft in the same direction as said one clutch shaft and another driving connection for driving said output shaft in the opposite direction.

3. A steering axle and transmission comprising an input shaft, a pair of output shafts, a pair of parallel clutch shafts geared together, one of said clutch shafts being disposed above the other, reversible gearing between said input and clutch shafts for selectively driving said clutch shafts from said input shaft, a set of three gears rotatably journaled on one of said clutch shafts, geared with one of said output shafts, another set of gears rotatably journaled on the other of said clutch shafts, geared with the other of said output shafts, and a normally disengaged clutch operatively disposed between each of said clutch shafts and each of said gears thereon for selectively coupling said gears on each of the clutch shafts thereto, the geared interconnection between said clutch shafts being independent of the geared interconnections between said clutch and output shafts, the geared interconnections between each of said clutch shafts and its associated output shaft providing a plurality of clutch controlled independent parallel driving connections between said shafts, said output shafts being disposed so that a line extending between the centers of said clutch shafts passes between said output shafts, said geared interconnection between said clutch shafts being disposed between said reversible gearing and said sets of gears journaled on said clutch shafts.

4. A transmission according to claim 3 wherein the said driving connections between one of said clutch shafts and its associated output shaft includes one driving connection for driving said output shaft in the same direction as said one clutch shaft and another driving connection for driving said output shaft in the opposite direction.

5. A counterrotating steering axle and transmission comprising an input shaft, a pair of output shafts, a pair of clutch shafts geared together, reversible gearing between said input and clutch shafts for selectively driving said clutch shafts from said input shaft, a set of gears rotatably journaled on one of said clutch shafts, geared with one of said output shafts, another set of gears rotatably journaled on the other of said clutch shafts, geared with the other of said output shafts, and a normally disengaged clutch operatively disposed between each of said clutch shafts and each of said gears thereon for selectively coupling said gears on each of the clutch shafts thereto, the geared interconnection between said clutch shafts being independent of the geared interconnections between said clutch and output shafts, the geared interconnections between said one of said clutch and output shafts providing a plurality of clutch controlled parallel driving connections between said one of said clutch and output shafts, one of said driving connections driving said one output shaft in the same direction as said one clutch shaft and another of said driving connections driving said one output shaft in the opposite direction.

6. A transmission according to claim 5 wherein said output shafts are disposed so that a line extending between the centers of said clutch shafts passes between said output shafts.

7. A counterrotating steering axle and transmission comprising an input shaft, a pair of output shafts, a pair of clutch shafts geared together, reversible gearing between said input and clutch shafts for selectively driving said clutch shafts from said input shaft in either direction with respect to said input shaft, a set of gears rotatably journaled on one of said clutch shafts, geared with one of said output shafts, another set of gears rotatably journaled on the other of said clutch shafts, geared with the other of said output shafts, and a normally disengaged clutch operatively disposed between each of said clutch shafts and each of said gears thereon for selectively coupling said gears on each of the clutch shafts thereto, the geared interconnection between said clutch shafts being independent of the geared interconnections between said clutch and output shafts, the geared interconnections between said one of said clutch and output shafts providing a plurality of clutch controlled parallel driving connections between said one of said clutch and output shafts, one of said driving connections driving said one output shaft in a forward direction and another of said driving connections driving said one output shaft in a reverse direction with respect to said one clutch shaft.

8. A counterrotating steering axle and transmission according to claim 7 wherein the geared interconnections between said other of said clutch and output shafts provide a plurality of clutch controlled parallel driving connections between said other clutch and output shaft.

9. A counterrotating steering axle and transmission comprising an input shaft, a pair of output shafts, a pair of parallel clutch shafts geared together, reversible gearing between said input and clutch shafts for driving said clutch shafts in either direction with respect to said input shaft, a set of gears rotatably journaled on one of said clutch shafts, a set of gears fixed to rotate with one of said output shafts, one of said gears on said one output shaft being in constant mesh with one of said gears on said one clutch shaft, an idler gear in constant mesh with another gear on said one output shaft and another gear on said one clutch shaft, another set of gears rotatably journaled on the other of said clutch shafts, geared with the other of said output shafts, and a normally disengaged clutch operatively disposed between each of said clutch shafts and each of said gears thereon for selectively coupling said gears on each of the clutch shafts thereto.

10. A transmission according to claim 9 wherein the geared interconnection between said clutch shafts is independent of the geared interconnections between said clutch and output shafts.

11. A transmission comprising a pair of output shafts, a pair of clutch shafts, a set of gears rotatably journaled on one of said clutch shafts, a set of gears fixed to rotate with one of said output shafts, one of said gears on said one output shaft being in constant mesh with one of said gears on said one clutch shaft, an idler gear in constant mesh with another gear on said one output shaft and another gear on said one clutch shaft, another set of gears rotatably journaled on the other of said clutch shafts, geared with the other of said output shafts, and a normally disengaged clutch operatively disposed between each of said clutch shafts and each of said gears thereon for selectively coupling said gears on each of the clutch shafts thereto.

12. A counterrotating steering axle and transmission comprising a pair of output shafts, a pair of clutch shafts geared together, a set of gears rotatably journaled on one of said clutch shafts, a set of gears fixed to rotate with one of said output shafts, one of said gears on said one output shaft being in constant mesh with one of said gears on said one clutch shaft, an idler gear in constant mesh with another gear on said one output shaft and another gear on said one clutch shaft, another set of gears rotatably journaled on the other of said clutch shafts, geared with the other of said output shafts, and a normally disengaged clutch operatively disposed between each of said clutch shafts and each of said gears thereon for selectively coupling said gears on each of the clutch shafts thereto, the geared interconnection between said clutch shafts being independent of the geared interconnections between said clutch and output shafts.

13. A counterrotating steering axle and transmission comprising an input shaft, a pair of output shafts, a pair of clutch shafts geared together so as to turn in opposite directions, reversible gearing interconnecting said input and clutch shafts for selectively driving said clutch shafts in either direction with respect to said input shaft, a set of gears rotatably journaled on one of said clutch shafts, a set of gears fixed to rotate with one of said output shafts, one of said gears on said one output shaft being in constant mesh with one of said gears, on said one clutch shaft, an idler gear in constant mesh with another gear on said one output shaft and another gear on said one clutch shaft, another set of gears rotatably journaled on the other of said clutch shafts, geared with the other of said output shafts, and a normally disengaged clutch operatively disposed between each of said clutch shafts and each of said gears thereon for selectively coupling said gears on each of the clutch shafts thereto, the geared interconnection between said clutch shafts being independent of the geared interconnections between said clutch and output shafts.

14. A counterrotating steering axle and transmission comprising an input shaft, a pair of output shafts, a pair of clutch shafts geared together so as to turn in opposite directions, reversible gearing interconnecting said input and clutch shafts for selectively driving said clutch shafts in either direction with respect to said input shaft, a set of gears rotatably journaled on one of said clutch shafts, geared with one of said output shafts to provide a plurality of parallel driving connections between said gears on said one clutch shaft and said one output shaft, another set of gears rotatably journaled on the other of said clutch shafts, geared with the other of said output shafts to provide a plurality of parallel driving connections between said gears on said other clutch shaft and said other output shaft, and a normally disengaged clutch operatively disposed between each of said clutch shafts and each of said gears thereon for selectively coupling said gears on each of the clutch shafts thereto, the geared interconnection between said clutch shafts being independent of the driving connections between said clutch and output shafts, one of said driving connections between said one of said clutch and output shafts including an even number of gears and another of said driving connections between said one of said clutch and output shafts including an odd number of gears whereby said one output shaft may be driven in the same or in the opposite direction as said one clutch shaft.

15. A counterrotating steering axle and transmission comprising a pair of output shafts, a pair of clutch shafts geared together, a set of gears rotatably journaled on one of said clutch shafts, geared with one of said output shafts to provide a plurality of parallel driving connections between said gears on said one clutch shaft and said one output shaft, another set of gears rotatably journaled on the other of said clutch shafts, geared with the other of said output shafts to provide a plurality of parallel driving connections between said gears on said other clutch shaft and said other output shaft, and a normally disengaged clutch operatively disposed between each of said clutch shafts and each of said gears thereon for selectively coupling said gears on each of the clutch shafts thereto, the geared interconnection between said clutch shafts being independent of the driving connections between said clutch and output shafts, one of said driving connections between said one of said clutch and output shafts including an even number of gears and another of said driving connections between said one of said clutch and output shafts including an odd number of gears.

16. A counterrotating steering axle and transmission comprising a pair of clutch shafts geared together, reversible gearing drivingly connected to said shafts for selectively driving the same in either direction, a pair of output shafts, other gearing including a normally disengaged clutch providing parallel forward and reverse driving connections between one of said clutch shafts and one of said output shafts and other gearing providing a plurality of parallel driving connections between the other of said clutch and output shafts.

17. A steering axle and transmission comprising a pair of clutch shafts geared together, a pair of output shafts, other gearing including a normally disengaged clutch providing selective forward and reverse driving connections between one of said clutch shafts and one of said output shafts for driving the latter whereby said one of said output shafts may be driven in the same direction as said one of said clutch shafts or in the opposite direction relative thereto, and other gearing providing a plurality of selective driving connections between the other of said clutch and output shafts.

18. A counterrotating steering axle and transmission comprising an input shaft, a pair of parallel shafts geared together, reversible gearing between said input and parallel shafts for driving the latter in either direction, a pair of output shafts, other gearing including a normally disengaged clutch providing forward and reverse driving connections between one of said parallel shafts and one of said output shafts and other gearing providing a plurality of driving connections between the other of said parallel and output shafts.

19. A steering axle and transmission according to claim 17 wherein said gearing between said one of said clutch and output shafts provides an odd number of selective driving connections therebetween and wherein said gearing between the other of said clutch and output shafts provides an even number of selective driving connections therebetween.

20. A steering axle and transmission according to claim 17 wherein said gearing between said one of said clutch and output shafts provides a different number of selective driving connections than the gearing between the other of said clutch and output shafts.

21. A steering axle and transmission according to claim 17 wherein each of said driving connections between said clutch and output shafts includes a normally disengaged multiple disc clutch.

22. A steering axle and transmission comprising a pair of parallel shafts geared together and arranged to be selectively power driven in either direction, a pair of output shafts, gearing providing selective forward and reverse clutch-controlled power driving connections between one of said parallel shafts and one of said output shafts for driving the latter whereby said one of said output shafts may be driven from said one of said parallel shafts in the same direction of rotation as said one of said parallel shafts or in the opposite direction of rotation, gearing providing a plurality of selective clutch-controlled power transmitting driving connections between the other of said parallel shafts and the other of said output shafts, said gearing between said one of said clutch and output shafts being independent of the other gearing between the other of said clutch and output shafts and providing a different number of driving connections than said other gearing.

23. A steering axle and transmission including a pair of clutch shafts geared together, means arranged to selectively power drive said shafts in either direction, a pair of output shafts, gearing providing a plurality of selective clutch-controlled power transmitting driving connections between one of said clutch shafts and one of said output shafts, other gearing independent of said driving connections providing a different number of selective clutch-controlled power transmitting driving connections between the other of said clutch and output shafts, each of said driving connections including a normally disengaged multiple disc clutch, said driving connections between said one of said clutch and output shafts being operable to drive said one of said output shafts from said one of said clutch shafts in a different direction of rotation than another of said driving connections between said one of said clutch and output shafts.

References Cited in the file of this patent

UNITED STATES PATENTS 2,866,350      Gerst _____ Dec. 30, 1958